(12) United States Patent
Lee (10) Patent No.: US 10,371,549 B2
(45) Date of Patent: Aug. 6, 2019

(54) MAGNETIC SENSOR SYSTEM (71) Applicant: HAMLIN ELECTRONICS (SUZHOU) CO., LTD., Jiangsu (CN)

(72) Inventor: Seong-Jae Lee, Mount Prospect, IL (US)

(73) Assignee: HAMLIN ELECTRONICS (SUZHOU) CO., LTD., Suzhou, Jiangsu Province (CN)

( * ) Notice: Subject to any disclaimer, the term of this patent is extended or adjusted under 35 U.S.C. 154(b) by 0 days.

(21) Appl. No.: 15/077,400

(22) Filed: Mar. 22, 2016

(65) Prior Publication Data

US 2017/0276513 A1 Sep. 28, 2017

(51) Int. Cl.
*G01B 7/14* (2006.01)
*G01D 5/14* (2006.01)

(52) U.S. Cl.
CPC .................... *G01D 5/145* (2013.01)

(58) Field of Classification Search
CPC ..................................... G01D 5/145
USPC ...................................... 324/207.2
See application file for complete search history.

(56) References Cited

U.S. PATENT DOCUMENTS

| | | | |
|---|---|---|---|
| 6,205,868 B1 | 3/2001 | Miller | |
| 6,357,091 B1 | 3/2002 | Devereaux | |
| 6,829,952 B2 | 12/2004 | Stanley et al. | |
| 6,851,503 B2 | 2/2005 | Almaraz et al. | |
| 6,993,436 B2 | 1/2006 | Specht et al. | |
| 7,023,202 B2* | 4/2006 | Hagino | G01D 5/145 324/207.2 |
| 7,268,538 B2* | 9/2007 | Johnson | G01D 5/145 324/207.2 |
| 7,378,841 B2* | 5/2008 | Kurita | G01D 5/145 324/207.25 |
| 7,383,744 B2 | 6/2008 | Frank | |
| 8,520,887 B2 | 8/2013 | Simidian, II et al. | |
| 9,592,781 B2 | 3/2017 | Johnson et al. | |
| 2005/0033529 A1* | 2/2005 | Specht | B60R 22/48 702/41 |
| 2008/0175721 A1 | 7/2008 | Yang | |

(Continued)

OTHER PUBLICATIONS

Zhao, L et al. "Design and Realization of a Three Degrees of Freedom Displacement Measurement System Composed of Hall Sensors Based on Magnetic Field Fitting by an Elliptic Function", Sep. 8 2015. [retrieved Apr. 26, 2017]; Retrieved from the Internet <URL:http://www.mdpi.com/1424-8220/15/9/22530>.p. 22533, paragraph 3, figures 2-4.

(Continued)

*Primary Examiner* — Reena Aurora (57) ABSTRACT

Provided herein are improved magnetic sensor systems for use in linear measurement systems. A magnetic sensor can be positioned offset from a center line positioned between two magnets. The two magnets can be oriented so as to provide opposite polarities. As the magnetic sensor traverses a path parallel to the magnets and parallel to the center line, the sensor can detect a magnetic flux density provided by the two magnets. Offsetting the magnetic sensor from the center line can improve the linear range of the magnetic sensor, thereby improving the reliability and accuracy of an output signal generated by the magnetic sensor based on the detected magnetic flux density.

19 Claims, 10 Drawing Sheets (56) References Cited

U.S. PATENT DOCUMENTS

2010/0308805 A1    12/2010    Stuve

OTHER PUBLICATIONS

"NdFeB (neodymium) cylindrical magnets, small (2-10 mm)" by Enes Magnesy Pawel Zientek Sp.k, Oct. 12, 2014. [retrieved Apr. 26, 2017]; Retrieved from the Internet <http://www.enesmagnets.pl/gb/ndfeb-(neodymium)-cylindrical-magnets,-small-br-(-2-10mm)-g 1-231.html>;p. 2.
ISR and Written Opinion, dated May 18, 20107, in corresponding PCT/US2017/021263.

* cited by examiner

MAGNETIC SENSOR SYSTEM

FIELD OF THE DISCLOSURE

This disclosure relates generally to the field of magnetic sensor systems, more particularly, to linear measurement systems using magnetic sensors.

BACKGROUND OF THE DISCLOSURE

In many conventional measurement systems, magnetic sensors such as Hall sensors are used. For example, for a conventional tension sensor for a seat buckle, a Hall sensor and two magnets can be used to generate an output signal indicative of varying levels of tension. Typically, in such systems, the Hall sensor is positioned in the center of two magnets. The Hall sensor travels linearly along a center line between the two magnets as tension is applied and generates the output signal.

The linearity of many conventional magnetic sensor systems—including many conventional tension sensors—is limited by the arrangement of the sensor and the magnets. Specifically, the linearity of the sensor is often limited to positions very near the midpoints of the two magnets. This limited linearity range in such conventional systems limits the reliability and accuracy of measurements made by the magnetic sensor, thereby limiting the usefulness of such conventional systems.

To improve the linear range of conventional magnetic sensor systems, larger magnets can be used. However, the use of larger magnets can introduce significant size burdens that must be accounted for during the design and use of such systems. In many instances, employing larger magnets prevents conventional magnetic sensor systems from fitting into tight spaces or restricted spaces where such systems are typically used.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Accordingly, there is a need for magnetic sensor systems that can provide extended linear ranges without imposing the need for larger magnets.

Various embodiments are generally directed to an improved magnetic sensor system with an extended linear range. Various embodiments provide an improved magnetic sensor system with an extended linear range that can be applied to any measurement system including linear displacement or linear distance measurement systems. Various embodiments provide a magnetic sensor system that includes one or more sensors and two or more magnets. Various embodiments provide a magnetic sensor system including a sensor that is offset from a center line positioned between two magnets having opposite polarities. Various embodiments provide a magnetic sensor system including a first sensor that is offset from a center line positioned between two magnets having opposite polarities and a second sensor offset from the center line in a direction opposite to the first sensor.

BRIEF DESCRIPTION OF THE DRAWINGS

By way of example, specific embodiments of the disclosed device will now be described, with reference to the accompanying drawings, in which.

DETAILED DESCRIPTION

The present disclosure will now be described more fully hereinafter with reference to the accompanying drawings, in which preferred embodiments are shown. This disclosure, however, may be embodied in many different forms and should not be construed as limited to the embodiments set forth herein. Rather, these embodiments are provided so that this disclosure will be thorough and complete, and will fully convey the scope of the disclosure to those skilled in the art. In the drawings, like numbers refer to like elements throughout.

Figure 1:
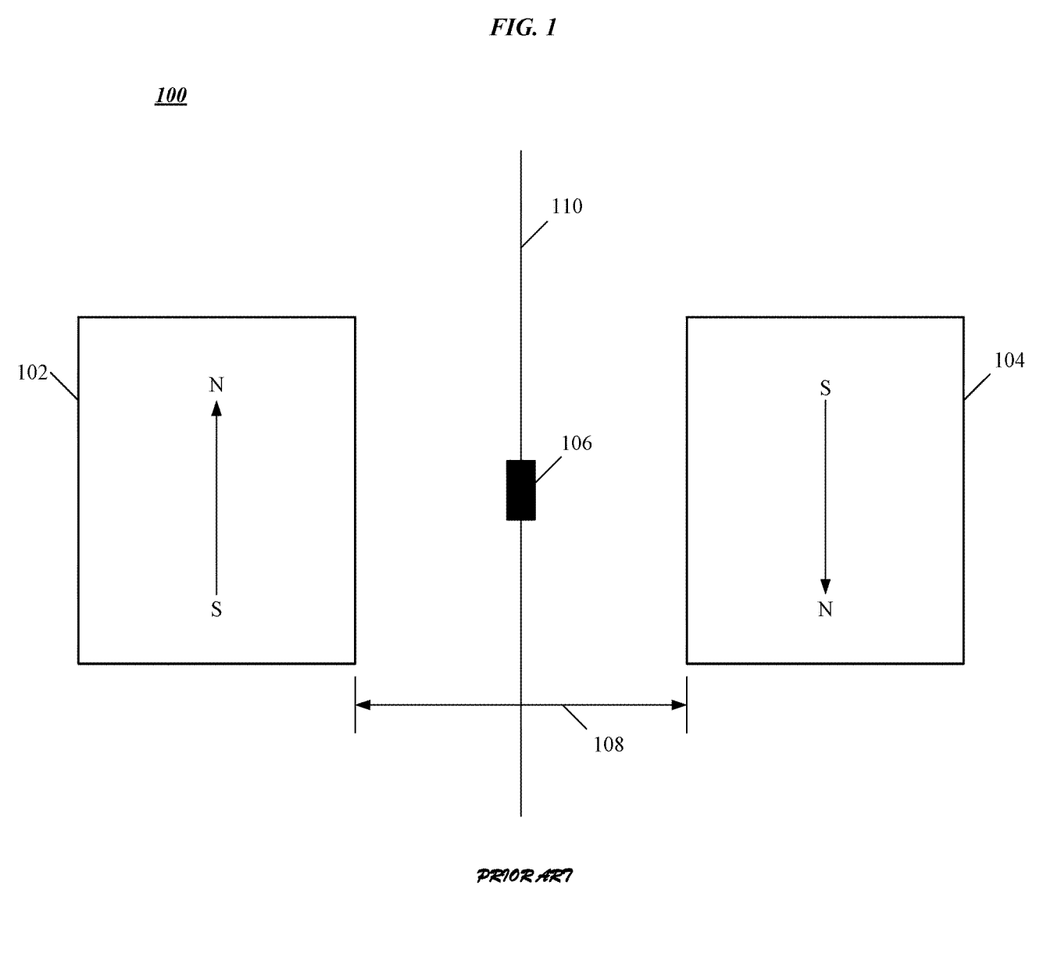
FIG. 1 illustrates a conventional magnetic sensor system.

FIG. 1 illustrates a conventional magnetic sensor system 100. The conventional magnetic sensor system 100 includes a first magnet 102, a second magnet 104, and a magnetic sensor 106. The first magnet 102 and the second magnet 104 can be separated by a distance 108. As shown in FIG. 1, the first magnet 102 and the second magnet 104 can be oriented in opposite manners relative to one another with respect to north and south poles of each of the first and second magnets 102 and 104. As such, the first magnet 102 and the second magnet 104 can be considered to be of opposite polarity.

The magnetic sensor 106 can be positioned in the middle between the first magnet 102 and the second magnet 104. The magnetic sensor 106 can traverse a path 110. The path 110 can be parallel to the first and second magnets 102 and 104. The path 110 can bisect the distance 108 such that the sensor 106 is separated from each of the first and second magnets 102 and 104 by the same distance.

The magnetic sensor 106 can detect a magnetic flux density provided by the first and second magnets 102 and 104. The magnetic flux density provided by the first and second magnets 102 and 104 can vary along the path 110. Accordingly, as the sensor 106 traverses the path 110, the sensor 106 can detect changes in the magnetic flux density. The sensor 106 can generate a signal based on the detected magnetic flux density and/or changes thereto.

The range of linearity of a signal generated by the sensor 106 is significantly limited by the arrangement of the conventional magnetic sensor system 100. As such, in the conventional magnetic sensor system 100, the sensor 106 can only reliably output a linear signal when it is confined to positions near the midpoint of the first and second magnets 102 and 104. This limited range of linearity greatly reduces the ability of the conventional magnetic sensor system 100 to reliably provide signals based on measured magnetic flux density over needed distances. To improve the range of linearity, the sizes of the first and second magnets 102 and 104 can be increased. However, in doing so, movement of the sensor 106 may become overly restricted and/or the conventional magnetic sensor system 100 may become too large to be used in confined areas where magnetic sensor systems are typically used.

Figure 2:
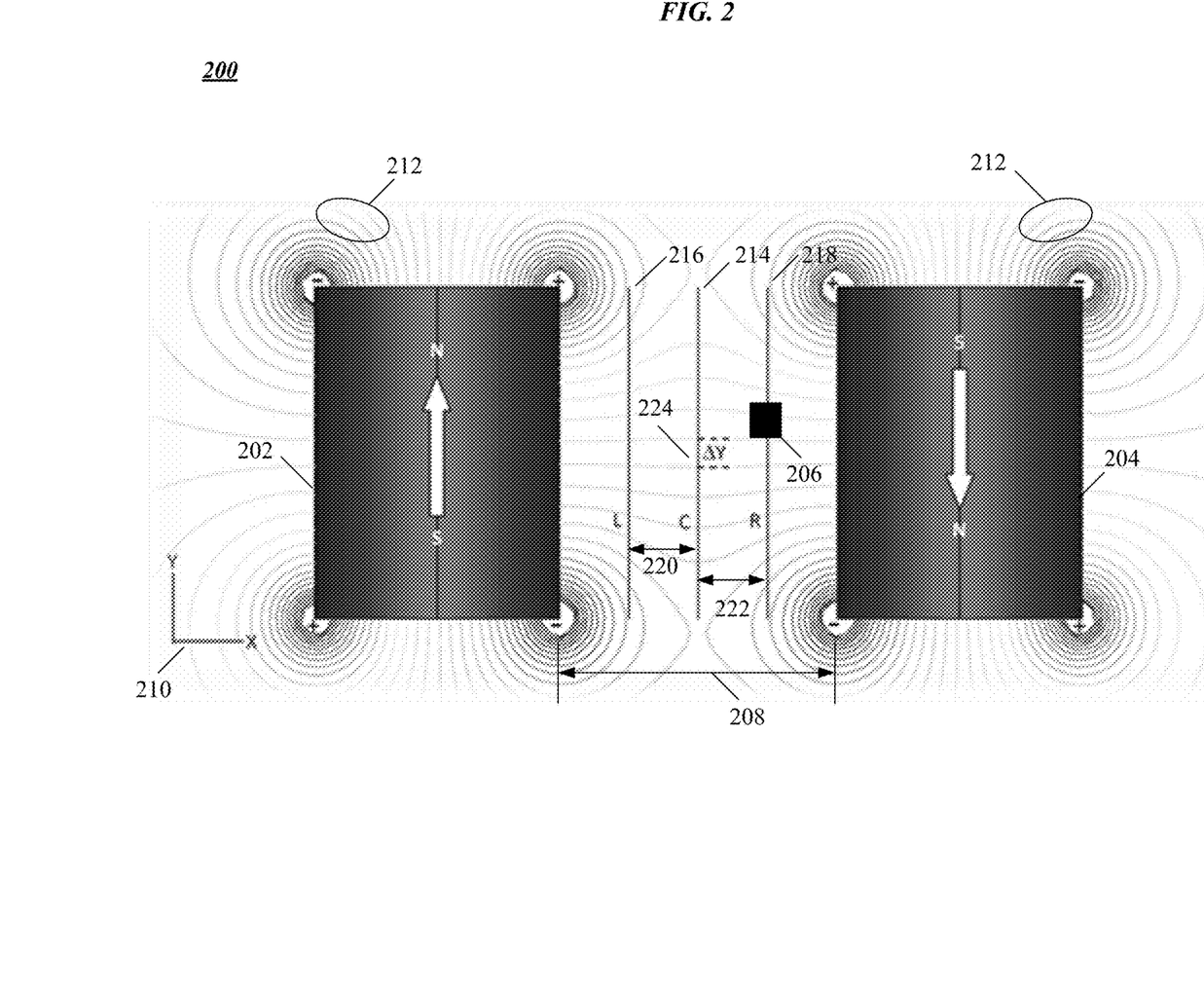
FIG. 2 illustrates a first exemplary magnetic sensor system.

FIG. 2 illustrates an exemplary magnetic sensor system 200. The exemplary magnetic sensor system 200 includes a first magnet 202, a second magnet 204, and a magnetic sensor 206. The magnetic sensor 206 can be any type of sensor for detecting or measuring magnetic flux density such as, for example, a Hall sensor.

As shown in FIG. 2, the first and second magnets 202 and 204 are separated by a gap distance 208. The first and second magnets 202 and 204 can be of the same size and shape. As an example, the first and second magnets 202 and 204 can be cylindrical magnets or can be rectangular magnets. The first and second magnets 202 and 204 can be oriented or positioned parallel to one another.

To foster explanation, orientation axes 210 is provided in FIG. 2. The orientation axes 210 include an "x" axis and a "y" axis as shown which, as an example and for purposes of illustration only, can be considered as representing horizontal and vertical directions, respectively. The first and second magnets 202 and 204 can be horizontally separated as shown relative to the "x" axis. The magnets 202 and 204 can be also be oriented vertically relative to the "y" axis.

Contours 212 can represent a component of the magnetic flux density provided by the first and second magnets 202 and 204. As an example, the contours 212 can represent variations in magnitude of the "x" component of the magnetic flux density provided by the first and second magnets 202 and 204 (relative to the orientation axes 210). The sensor 206 can measure variations in the magnetic flux density represented by the contours 212. That is, the sensor 206 can measure the "x" component of the magnetic flux density represented by the contours 212.

As an example, the first and second magnets can be cylindrical magnets of the same size having diameters of approximately 4.4 millimeters (mm) and lengths of 6 mm. Further, the gap distance 208 between the magnets can be approximately 5.0 mm. Additionally, the contours 212 can represent the x component of the magnetic flux density that ranges from −0.4 Tesla (T) to 0.4 T (such that contours of the x component of the magnetic flux density having magnitudes larger than 0.4 T or smaller than −0.4 T are not shown). The "+" and "−" signs shown in FIG. 2 can represent positive and negative values of the x component of the magnetic flux density provided by the first and second magnets 202 and 204, respectively.

As shown in FIG. 2, the first and second magnets 202 and 204 can be oriented opposite to one another. Specifically, the first magnet 202 can be oriented such that its north pole is oriented upwards (relative to the orientation axes 210) and the second magnet 204 can be oriented such that its north pole is oriented downwards (relative to the orientation axes 210). The orientation of the first magnet 202 as shown in FIG. 2 can be considered a first orientation or state and the orientation of the second magnet 204 as shown in FIG. 2 can be considered a second orientation or state. As such, the first magnet 202 can be associated with providing (or oriented according to) a first polarity and the second magnet 204 can be associated with providing (or oriented according to) a second polarity. Accordingly, the first and second magnets 202 and 204 as shown in FIG. 2 are oriented with opposite polarities relative to one another.

FIG. 2 further shows a center line or path 214, a left line or path 216, and a right line or path 218. The "left" and "right" lines 216 and 218 are considered to be oriented as such for illustration and explanation purposes only (e.g., relative to the orientation axes 210). The center line 214 can be parallel to the first and second magnets 202 and 204. As an example, the center line 214 can be parallel to a central vertical axis of the first magnet 202 and the second magnet 204. The center line 214 can be positioned in the center between the first and second magnets 202 and 204 such that a distance between the center line 214 and the first magnet 202 is equal to the distance between the center line 214 and the second magnet 204 (e.g., the center line 214 can bisect the gap distance 208).

The left line 216 can be offset from the center line 214. Specifically, the left line 216 can be offset from the center line 214 by a distance 220. The left line 216 can be positioned closer to the first magnet 202 relative to the center line 214 as shown in FIG. 2.

Similarly, the right line 218 can be offset from the center line 214. Specifically, the right line 218 can be offset from the center line 214 by a distance 222. The right line 218 can be positioned closer to the second magnet 204 relative to the center line 214 as shown in FIG. 2.

The offset distances 220 and 222 can be any distance. The offset distances 220 and 222 can be, as an example, equal such that the left line 216 is offset from the center line 214 by an amount that is equal to the offset between the right line 218 and the center line 214. The left line 216 and the right line 218 can be parallel to the center line 214 and so also parallel to the first and second magnets 202 and 204 (e.g., parallel to a central vertical axis of the first magnet 202 and a central vertical axis of the second magnet 204). As an example, the offset distance 220 can be approximately 1.25 mm and the offset distance 222 can also be approximately 1.25 mm.

For the exemplary magnetic sensor system 200, the sensor 206 can be positioned along the path shown by the right line 218 (as shown in FIG. 2) or can be positioned along the path shown by the left line 216. As such, the left and right lines 216 and 218 can each be considered sensor lines. The sensor lines 216 and 218 are arranged such that when the sensor 206 is positioned on either sensor line 216 or 218, the sensor 206 would be closer to one of the two magnets 202 and 204. For example, when the sensor 206 is positioned on the sensor line 216, the sensor 206 will remain closer to the first magnet 202 than the second magnet 204 for all positions along the sensor line 216. Likewise, when the sensor 206 is positioned on the sensor line 218, the sensor 206 will remain closer to the second magnet 204 than the first magnet 202 for all positions along the sensor line 218.

To measure or detect the magnetic flux density (or changes thereto) provided by the first and second magnets 202 and 204, the sensor 206 can be moved along either of the sensor lines 214 and 216 while the first and second magnets 202 and 204 remain in a fixed or stationary position. Alternatively, the sensor 206 can be positioned on either of the sensor lines 216 or 218 and can remain in a fixed or stationary position as the first and second magnets 202 and 204 are moved in unison. Under such a scenario, the first and second magnets 202 and 204 can move along a path that is parallel to the sensor lines 216 and 218 (along the central vertical axes of the first and second magnets 202 and 204).

As an example, the positions of the first and second magnets 202 and 204 can be fixed relative to the sensor 206. Further, the sensor 206 can be positioned to traverse the path indicated by the sensor line 218. As the sensor 206 traverses the path indicated by the sensor line 218, the sensor 206 can measure or detect the magnetic flux density provided the first and second magnets 202 and 204 (e.g., the x component of the magnetic flux density). The sensor 206 can generate or produce an electrical signal based on the detected magnetic flux density. For example, the sensor 206 can generate a signal of relatively lower magnitude corresponding to a relatively weaker detected magnetic flux density and can generate a signal of relatively higher magnitude corresponding to a relatively stronger detected magnetic flux density. As shown in FIG. 2, as an example, the sensor 206 can detect negative values of the magnetic flux density at the lower end of the sensor line 218 and can detect positive values of the magnetic flux density at the upper end of the sensor line 218 (e.g., relative to the orientation axes 210).

The sensor 206, when positioned on one of the sensor lines 216 or 218, can have an extended linear range as compared to the sensor 206 being positioned on the center line 214 (or in comparison to the sensor 106 of the conventional magnetic measurement system 100). The extended linear range of the sensor 206 provided by being positioned on one of the sensor lines 216 or 218 is provided whether the sensor 206 is fixed relative to movement of the first and second magnets 202 and 204 or whether the sensor 206 is moved relative to a fixed positioning of the first and second magnets 202 and 206. As mentioned above, the sensor 206 can measure the x component of the magnetic flux density/magnetic fields as shown in FIG. 2.

The sensor lines 216 and 218 can provide an extended linear range for the sensor 206 relative to the center line 214 by being oriented to traverse or overlap larger regions of the contours 212 that have gaps or distances between the contours 212 that are the same or similar sizes. The contours 212 can represent different magnitudes of the magnetic flux density provided by the first and second magnets 202 and 204 (e.g., the x component of the magnetic flux density). Accordingly, gaps or distances between adjacent contours 212 can represent a difference in magnitude between adjacent contours 212. When the gaps between adjacent contours 212 remain fixed or are of approximately the same size, a signal generated by the sensor 206 can remain linear or more closely linear over such regions as compared to over regions where the gap distances vary.

As an example, a contour gap distance 224 is shown in FIG. 2 for the center line 214. As can be seen in FIG. 2, the contour gap distance 224 (shown in FIG. 2 as "ΔY") remains fairly uniform in a central region along the center line 214 between the first and second magnets 202 and 204. However, at the top and bottom ends of the center line 214, the gaps between the contours 212 increase such that the contour gap distance 224 varies considerably. Since the linear range of a sensor depends on the gap distance 224 remaining approximately uniform, a sensor traversing the center line 214 would have a very limited linear range.

In contrast, the gaps between the contours 212 traversed by the sensor lines 216 and 218 remain approximately uniform over a longer distance, particularly at the ends of the sensor lines 216 and 218 compared to the center line 214. That is, gaps between contours 212 at the ends of the sensor lines 216 and 218 remain more uniform as compared to the center line 214. As a result, when the sensor 206 measures magnetic flux density along one of the sensor lines 216 or 218, the linear range of the sensor is extended in comparison to measuring magnetic flux density long the center line 214.

Accordingly, the magnetic sensor system 200 provides an enhanced linear magnetic measuring system. By positioning the sensor 206 offset from the center line 214, a linear range of the sensor 206—e.g., in terms of the relationship between detecting magnetic flux density and generating an output signal indicative of the detected magnetic flux density—can be extended, in comparison to the conventional magnetic sensor system 100.

Figure 3:
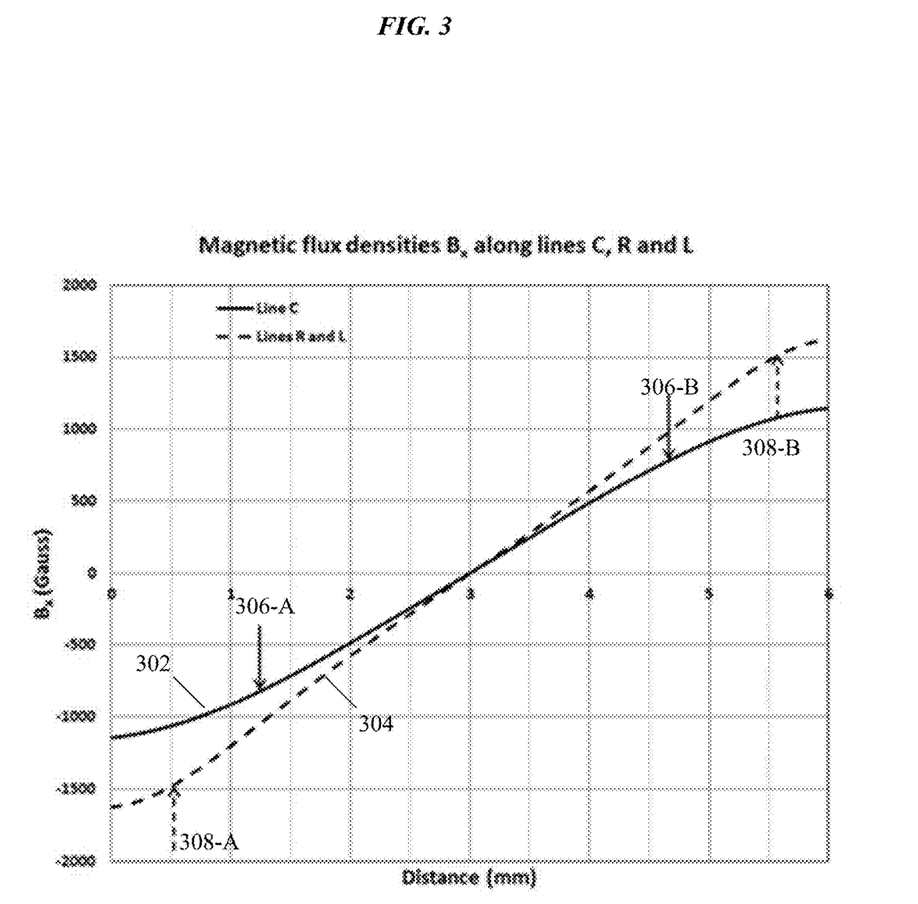
FIG. 3 illustrates an extended linear range provided by the first exemplary magnetic sensor system depicted in FIG. 2.

FIG. 3 illustrates an extended linear range provided by the exemplary magnetic sensor system 200. Specifically, FIG. 3 shows measured magnetic flux density (e.g., the x component of the magnetic flux density) relative to distance along the center line 214 and the sensor lines 216 and 218. Plot 302 can represent measured magnetic flux by a sensor positioned along the center line 214. A linear range of the plot 302 is indicated by first end 306-A and second end 306-B, and represents the linear range of a sensor positioned on the center line 214. In comparison, plot 304 can represent measured magnetic flux by a sensor (e.g., the sensor 206) positioned along either sensor line 216 or 218. The linear range of the plot 304 is indicated by first end 308-A and second end 308-B, and represents the linear range of a sensor (e.g., the sensor 206) positioned on either sensor lines 216 or 218. The plots 302 and 30 can be based on the exemplary cylindrical magnet shapes and sizes (e.g., cylindrical with diameters of 4.4. mm and lengths of 6 mm), exemplary gap distance 208 (5.0 mm), and exemplary offset distances 220 and 222 (1.25 mm each) discussed above.

As shown in FIG. 3, the linear range of plot 304 is larger or longer than the linear range of the plot 302. Specifically, the linear range of a sensor positioned on one of the sensor lines 216 or 218 is greater (e.g., in terms of distance) than the linear range of a sensor positioned on the center line 214. Consequently, a sensor positioned on either sensor line 216 or 218 can provide a signal indicative of the magnetic flux density that remains linear over a longer distance range, thereby improving the reliability, usefulness, and/or accuracy of a magnetic flux density measurement compared to such measurement made by a sensor along the center line 214. For the example cylindrical magnets sizes, gap distance, and offset distances, the linear range of the sensor 206 when positioned on the sensor line 216 or 218 can be extended by approximately 25% compared to the linearity range of a sensor provided by the conventional magnetic sensor system 100 (e.g., when the sensor is positioned along the center path 214).

The magnetic sensor system 200 can be used in any measurement system based on producing signals indicative of magnetic field density changes. The magnetic field density changes can be converted into useful electrical signals which can, for example, inform the weight of drivers or passengers of vehicles or can indicate the tension of a seat belt (e.g., whether the seat belt is buckled or not or is too tight or too loose). In general, the sensor 206 shown in FIG. 2 can generate or provide a signal based on detected magnetic flux density that depends on the orientation of the sensor 206 relative to the first and second magnets 202 and 204 to provide useful information about such positioning. As such, the magnetic measurement system 200 (and any magnetic measurement system of the present disclosure as described herein) can be used in any distance or displacement measurement system.

Figure 4:
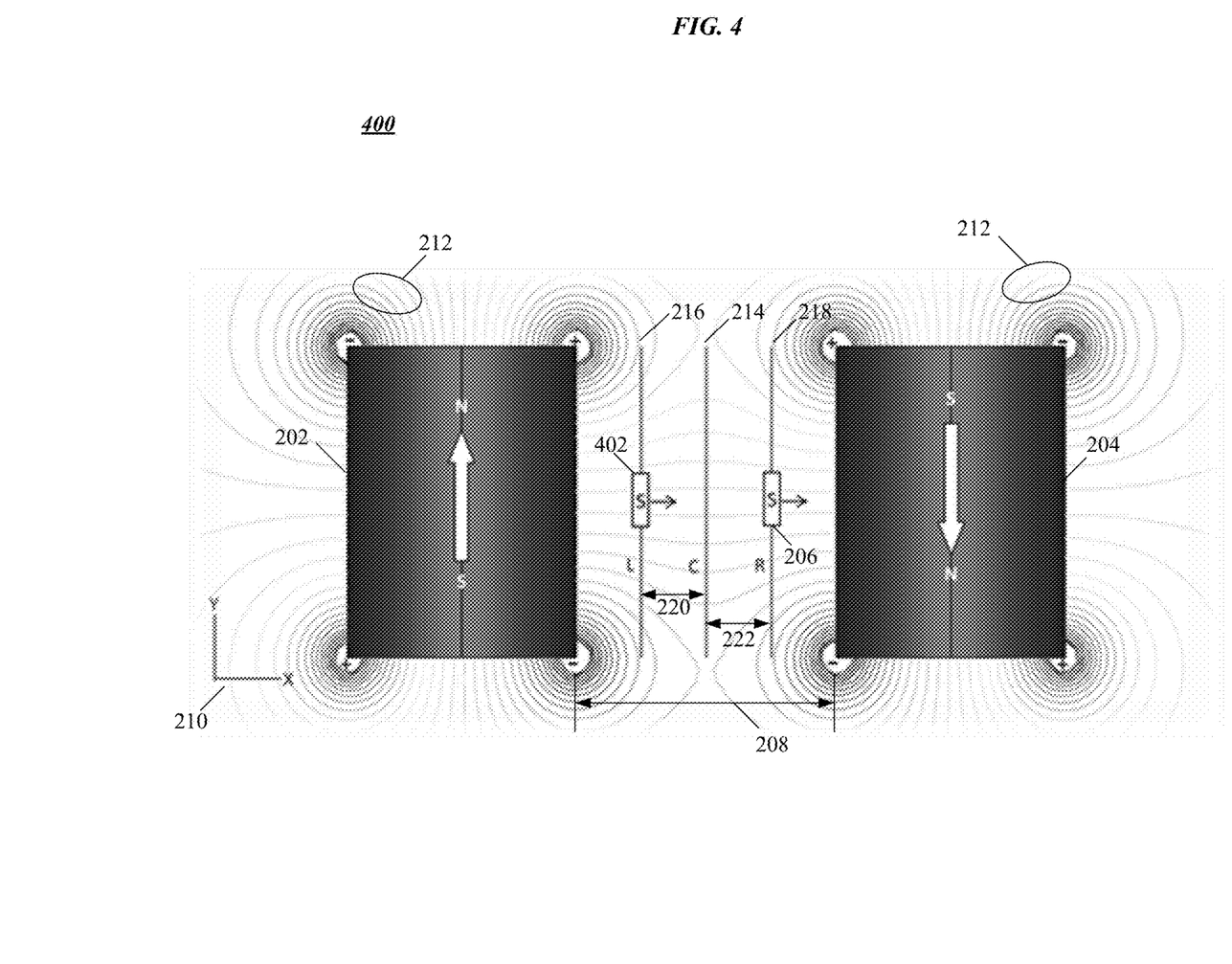
FIG. 4 illustrates a second exemplary magnetic sensor system.

FIG. 4 illustrates a second exemplary magnetic sensor system 400. The second exemplary magnetic sensor system 400, as shown, is similar to the first exemplary magnetic sensor system 200 but includes a second sensor 402. The second sensor 402 is positioned along the sensor line 216. The second sensor 402 can be any magnetic sensor including, for example, a Hall sensor.

The magnetic sensor system 400 can function and operate similarly to the magnetic sensor system 200. In the magnetic sensor system 400, however, each of the sensors 206 and 402 can measure or detect the magnetic flux density provided by the magnets 202 and 204. Specifically, the first sensor 206 and the second sensor 402 can each measure magnetic flux density such that the measured x components of the magnetic flux density can be added and the measured y components of the magnetic flux density can be canceled out.

In general, for many magnetic sensor systems, it is desirable to detect and measure one component of a magnetic flux density (e.g., the x component) while disregarding a second component of the magnetic flux density (e.g., the y component). For example, accurate measurement of the x component of the magnetic flux density can be adversely affected by undesired detection of the y component of the magnetic flux density. In various magnetic sensor systems, misalignments between the magnets and/or the magnetic sensors (e.g., during fabrication or from wear and tear over time) can cause a magnetic sensor to pick up or detect the undesired y component of the magnetic flux density.

The magnetic sensor measurement system 400 mitigates this risk by providing the two sensors 206 and 402. As an example, the sensors 206 and 402 can each measure the magnetic flux density of the environment provided by the magnets 202 and 204. Further, the x components of the measured magnetic flux densities as detected by the sensors 206 and 402 can be measured additively while the y components of the magnetic flux densities as detected by the sensors 206 and 402 can be cancelled out.

For example, the magnetic flux density measured by the sensor 206 can have a first component and a second component, corresponding to a desired x component measurement and an undesired y component measurement, respectively. Further, the magnetic flux density measured by the sensor 402 can also have a first component and a second component, corresponding to a desired x component measurement and an undesired y component measurement, respectively. With the magnetic sensor system 400, these first measured components (the x components of the detected magnetic flux density) can be measured additively while the second measured components (the y components of the detected magnetic flux density) can be canceled out (e.g., by subtracting the y component measurement from the sensor 206 from the y component measurement from the sensor 402). In doing so, the magnetic sensor measurement system 400 can provide improved magnetic flux density measurements.

Figure 5:
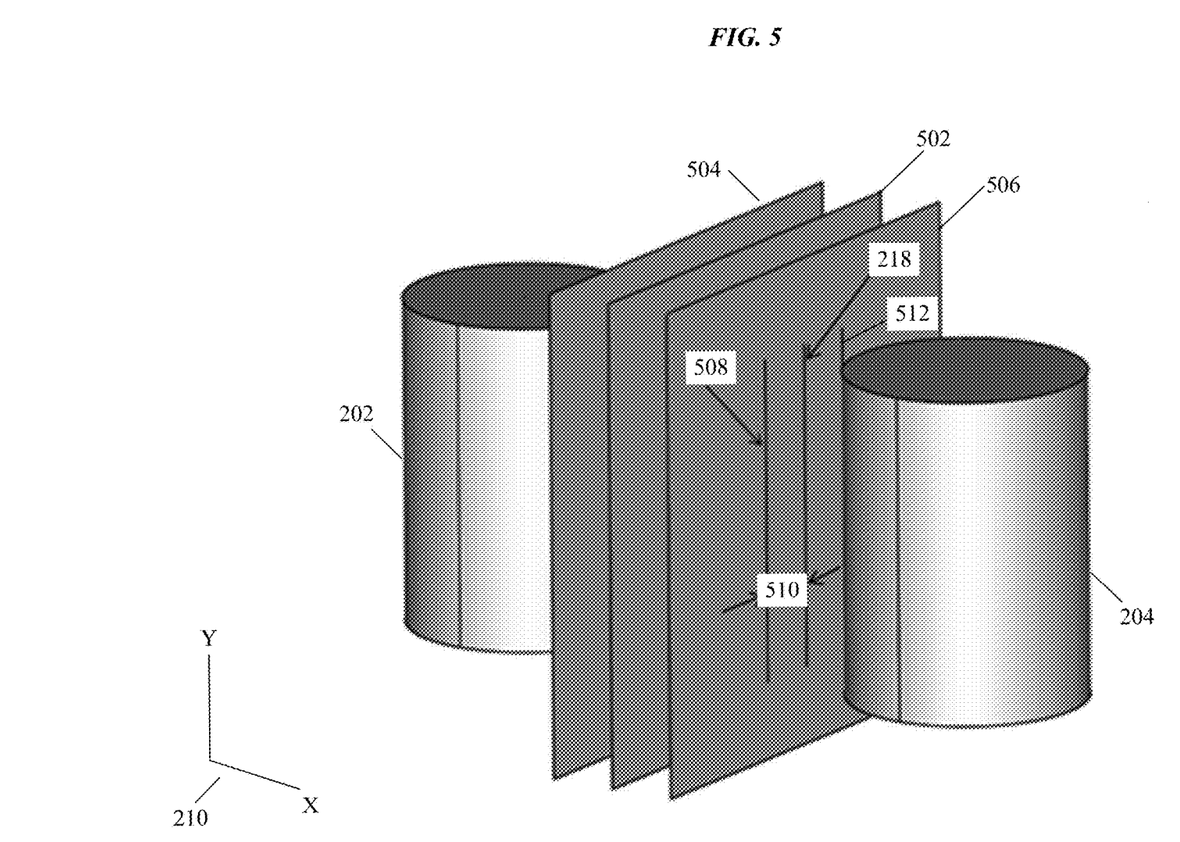
FIG. 5 illustrates possible variations to the first exemplary magnetic sensor system depicted in FIG. 2 and the second exemplary magnetic sensor system depicted in FIG. 4.

FIG. 5 illustrates possible variations in the positions of the sensors 206 and/or 402 depicted in magnetic measurement systems 200 and 400. FIG. 5 shows a first plane 502, a second plane 504, and a third plane 506. The planes 502-506 can be perpendicular to the orientation axes 210 (shown in FIG. 5 for illustrative purposes). That is, the planes 502-506 can be perpendicular to a plane that bisects the first and second magnets 202 and 204 and contains the center line 214 as shown, for example, in FIGS. 2 and 4. The plane 502 can correspond to the center line 214. The plane 504 can correspond to the left sensor line 516. The plane 506 can correspond to the right sensor line 218. Specifically, the planes 502-506 can indicate a range of positioning of the center line 214 and sensor lines 516 and 518, respectively, that is perpendicular to the orientation axes 210 (and therefore perpendicular to a plane that bisects the first and second magnets 202 and 204 and contains the center line 214 as shown in FIGS. 2 and 4).

For purposes of illustration, the right sensor line 218 is shown for reference. The plane 506 can include the right line 218. The plane 506, as mentioned above, can be perpendicular to the orientation axes 210. As an example, the plane 506 can represent a possible variation in the placement of the right sensor line 218 along a "z" direction. The plane 506—representing variation in a "z" direction—can be perpendicular to a plane that bisects the first and second magnets 202 (e.g., and includes a central vertical axis of each of the magnets 202 and 204) and is parallel to the orientation axes 210 (and can include the center line 214). According to the present disclosure, the sensor 206 can be offset along the plane 506 from the right sensor line 218. For example, the sensor 206 can be offset by a distance 510 along an offset line 508. Alternatively, as an example, the sensor 206 can be offset by a distance in the opposite direction along an offset line 512. The offset distance 510 can be any distance such as, for example, 1.25 mm.

Overall, FIG. 5 is intended to show variations of the positioning of the sensor 206 and/or 402 in the magnetic measurement systems 200 and 400 in three dimensions (and for further magnetic sensor systems of the present disclosure described below). In general, the sensors 206 and 402 can be offset in a direction that is perpendicular to a plane that bisects the first and second magnets 202 and 204 and is parallel to the orientation axes 210. As an example, the sensors 206 and/or 402 can be offset along this third axis by an amount that is approximately equal to or less than the offset distances 220 and/or 222. For example, for sensor 206, the offset distance 222 can be 1.5 mm and the offset distance 510 can also be 1.25 mm. As such, the sensor 206 can be positioned along the sensor line 508 (or sensor line 512) for measuring magnetic flux density. The positioning of the sensor 402 can be similarly varied. As shown, the plane 506 can contain the lines 508, 218, and 512. As such, the plane 506 can be perpendicular to a plane containing the lines 214, 216, and 218 as depicted, for example, in FIGS. 2 and 4.

Figure 6:
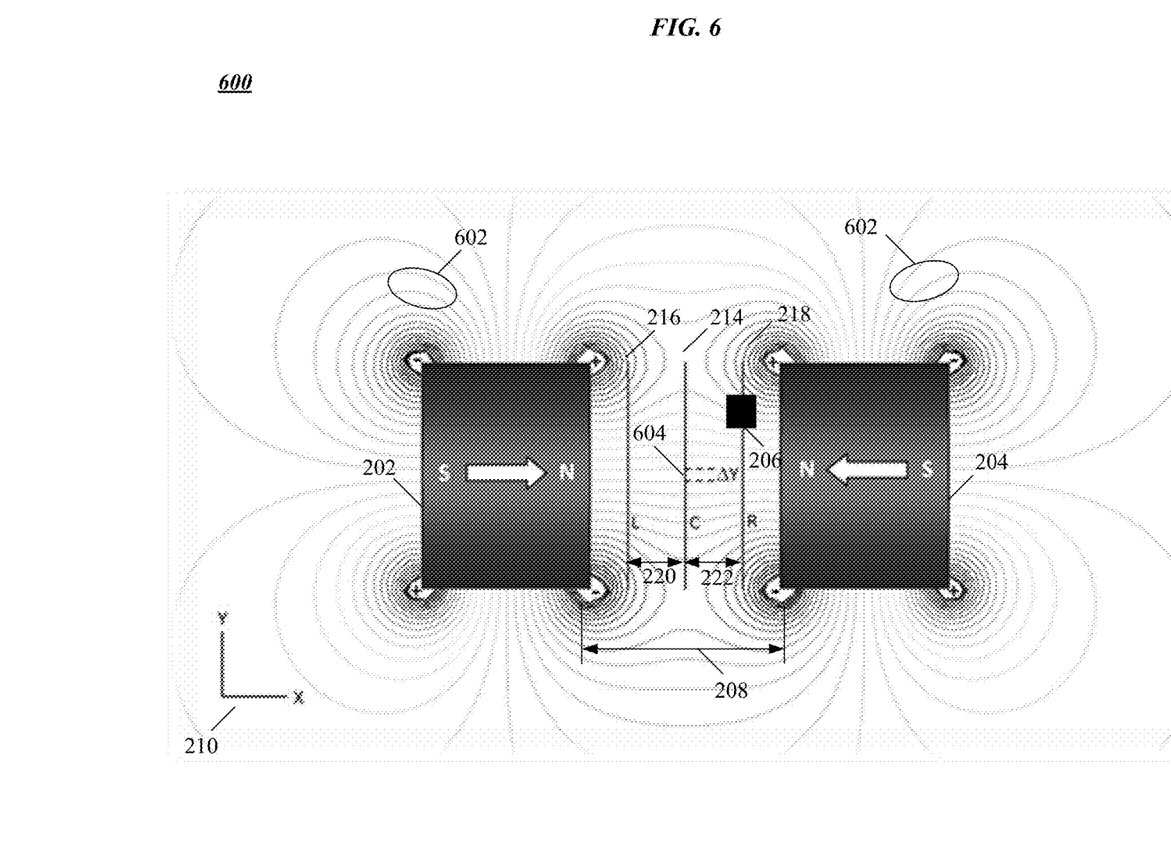
FIG. 6 illustrates a third exemplary magnetic measurement system.

FIG. 6 illustrates a third exemplary magnetic measurement system 600. As shown in FIG. 6, the magnetic measurement system 600 is similar to the magnetic measurement systems 200 and functions similarly. With the magnetic measurement system 600, however, the first and second magnets 202 and 204 are oriented differently than the orientation between the first and second magnets 202 and 204 as shown in FIG. 2 for the magnetic measurement system 200. Specifically, the first magnet 202 is oriented according to a third orientation or state such that its north pole is positioned closer to the sensor line 216 relative to its south pole. Similarly, the second magnet 204 is oriented according to a fourth orientation or state such that its north pole is positioned closer to the sensor line 218 relative to its south pole.

The positioning and orientation of the first and second magnets 202 and 204 as shown in FIG. 6 results in the first and second magnets 202 and 204 having opposite polarities. Further, in contrast to the magnetic measurement system 200, the sensor 206 as depicted in FIG. 6 can measure variations in the magnetic flux density along a y component (relative to the orientation axes 210). The orientation of the magnets 202 and 204 as shown in FIG. 6 is such that the north and south poles of the magnets are oriented parallel to the sensor line 214. In contrast, the orientation of the magnets 202 and 204 as shown in FIG. 6 is such that the north and south poles of the magnets are oriented perpendicular to the sensor line 214. In both arrangements, the magnets 202 and 204 can be considered as arranged having different polarities.

The magnetic flux density provided by the magnets 202 and 204 as oriented in FIG. 6 can vary from the magnetic flux density provided by the magnets 202 and 204 as oriented in FIG. 2. Specifically, FIG. 2 illustrates the x component of the magnetic flux density while FIG. 6 illustrates the y component of the magnetic flux density. As such, the magnetic flux density variations provided by the magnets 202 and 204 as depicted in FIG. 6 are represented by contours 610 (corresponding to the contour 212 shown in FIG. 2). As an example, the contours 610 can represent the y component of the magnetic flux density provided by the magnets 202 and 204 of FIG. 6 that ranges from −0.4 T to 0.4 T (such that contours of the y component of the magnetic flux density having magnitudes larger than 0.4 T or smaller than −0.4 T are not shown).

The shapes and sizes of the first and second magnets 202 and 204, the gap distance 208, the offset distances 220 and 222, as well as other features of the magnetic measurement system 600 can vary as discussed in relation to FIG. 2. As an example, the magnets 202 and 204 can be cylindrical magnets having diameters of approximately 4.4 mm and lengths of approximately 6 mm, with a gap distance 208 5.0 mm, and with offset distances 220 and 222 of 1.5 mm each.

As with the magnetic measurement system 200, the magnetic measurement system 600 can also provide for an enhanced or extended linear range of the sensor 206. This can be illustrated based on gap distance 604 (shown in FIG. 6 as "ΔY"). As can be seen in FIG. 6, the gap distance 604 remains fairly uniform in a central region along the center line 214 between the first and second magnets 202 and 204. However, at the top and bottom ends of the center line 214, the gaps between the contours 602 increase such that the gap distance 604 varies considerably. In contrast, the gaps between the contours 602 traversed by the sensor lines 216 and 218 remain approximately uniform over a longer range, particularly at the ends of the sensor lines 216 and 218 compared to the center line 214. That is, gaps between contours 602 at the ends of the sensor lines 216 and 218 remain more uniform as compared to the center line 214. As a result, when the sensor 206 measures magnetic flux density along one of the sensor lines 216 or 218, the linear range of the sensor is extended in comparison to measuring magnetic flux density along the center line 214.

Figure 7:
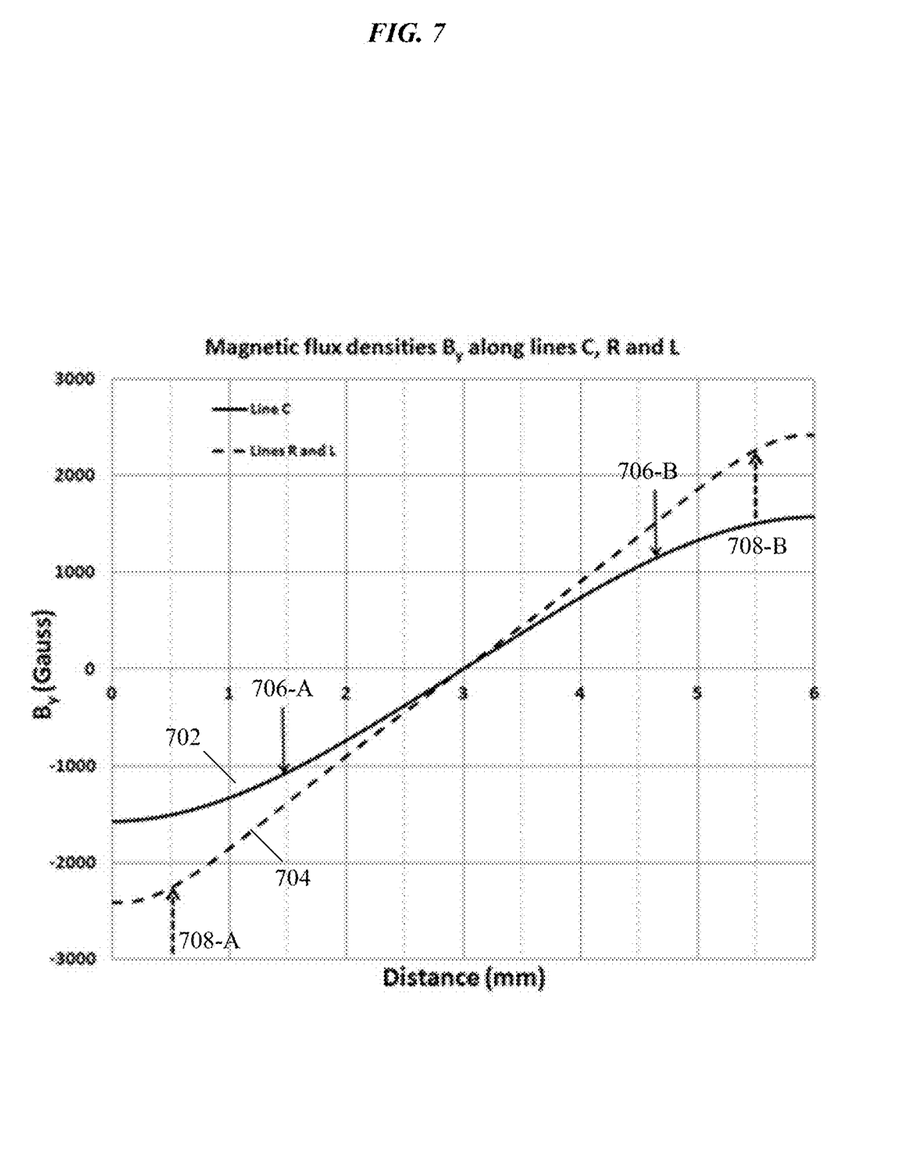
FIG. 7 illustrates an extended linear range provided by the third exemplary magnetic sensor system depicted in FIG. 6.

FIG. 7 illustrates an extended linear range provided by the exemplary magnetic sensor system 600. Specifically, FIG. 7 shows measured magnetic flux density (e.g., the y component of the magnetic flux density) relative to distance along the center line 214 and the sensor lines 216 and 218. Plot 702 can represent measured magnetic flux by a sensor positioned along the center line 214. A linear range of the plot 702 is indicated by first end 706-A and second end 706-B, and represents the linear range of a sensor positioned on the center line 214. In comparison, plot 704 can represent measured magnetic flux by a sensor (e.g., the sensor 206) along either sensor line 216 or 218. The linear range of the plot 704 is indicated by first end 708-A and second end 708-B, and represents the linear range of a sensor (e.g., the sensor 206) positioned on either sensor line 216 or 218.

As shown in FIG. 7, the linear range of plot 704 is larger or longer than the linear range of the plot 702. Specifically, the linear range of a sensor positioned on one of the sensor lines 216 or 218 is greater (e.g., in terms of distance) than the linear range of a sensor positioned on the center line 214. Consequently, a sensor positioned on either sensor line 216 or 218 can provide a signal indicative of the magnetic flux density that remains linear over a longer distance range, thereby improving the reliability, usefulness, and/or accuracy of a magnetic flux density measurement compared to such measurement made by a sensor along the center line 214. For the example cylindrical magnets sizes, gap distance, and offset distances stated above in relation to FIG. 6, the linear range of the sensor 206 when positioned on the sensor line 216 or 218 can be extended by approximately 30% compared to the linearity range of a sensor provided by the conventional magnetic sensor system 100 (e.g., when the sensor is positioned along the center path 214).

Figure 8:
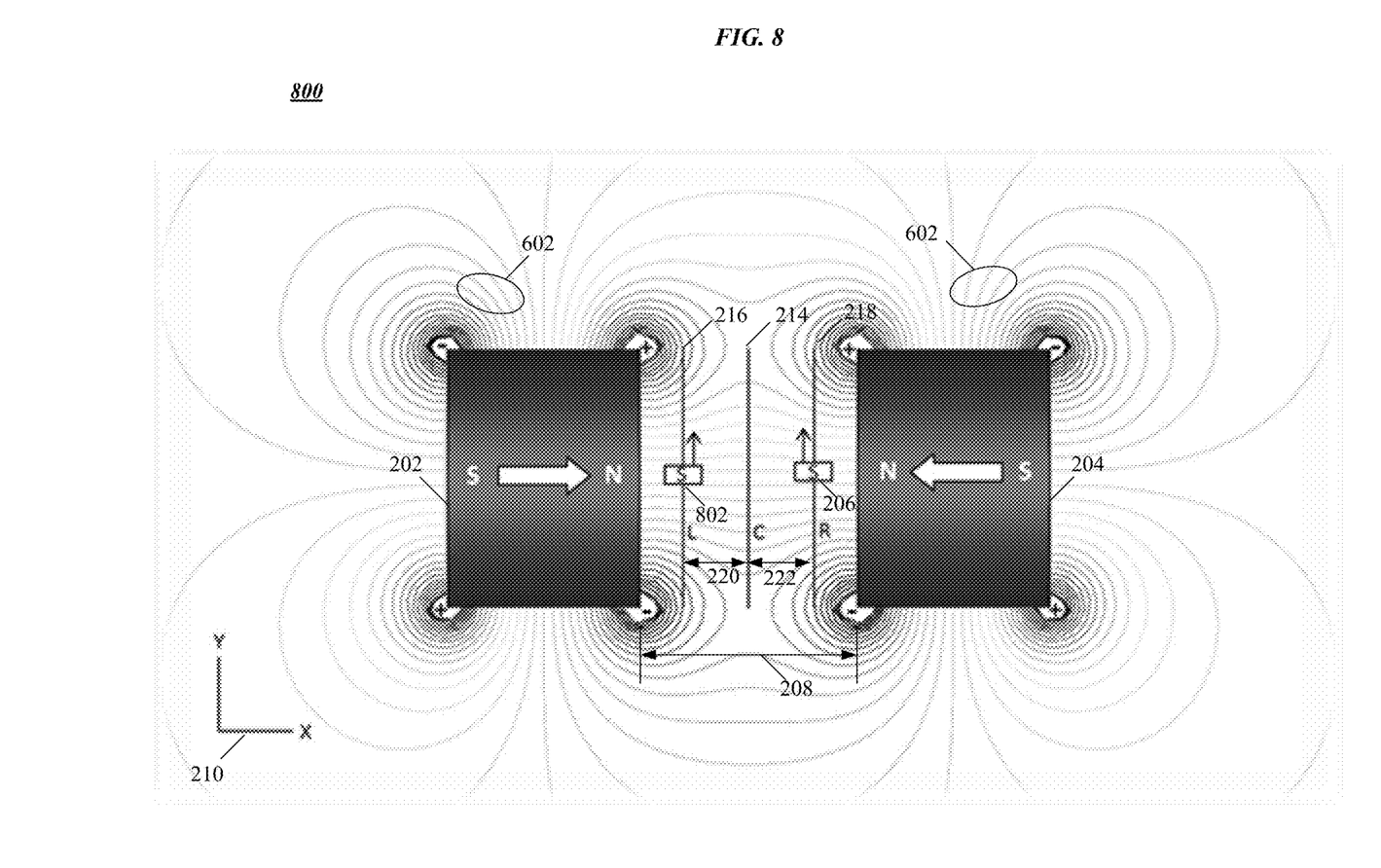
FIG. 8 illustrates a fourth exemplary magnetic sensor system.

FIG. 8 illustrates a fourth exemplary magnetic sensor system 800. The fourth exemplary magnetic sensor system 800, as shown, is similar to the third exemplary magnetic sensor system 600 but includes a second sensor 802. The second sensor 802 is positioned along the sensor line 216. The second sensor 802 can be any magnetic sensor including, for example, a Hall sensor. By including two sensors, the fourth exemplary magnetic sensor system 800 can improve detection of a first component of a magnetic flux density provided by the first and second magnets 202 and 204 (e.g., the y component as shown in relation to FIG. 8) while reducing unwanted effects from detection of a second component of the magnetic flux density (e.g., the x component as shown in relation to FIG. 8), as explained in relation to the magnetic sensor system 400.

The sensors 206 and 802 can each measure the magnetic flux density of the environment provided by the magnets 202 and 204. Specifically, the y components of the magnetic flux densities as detected by the sensors 206 and 802 can be measured additively while the x components of the magnetic flux densities as detected by the sensors 206 and 802 can be cancelled out. For example, the magnetic flux density measured by the sensor 206 can have a first component and a second component, corresponding to a desired y component measurement and an undesired x component measurement, respectively. Further, the magnetic flux density measured by the sensor 802 can also have a first component and a second component, corresponding to a desired y component measurement and an undesired x component measurement, respectively. With the magnetic sensor system 800, these first measured components (the y components of the detected magnetic flux density) can be measured additively while the second measured components (the x components of the detected magnetic flux density) can be canceled out (e.g., by subtracting the x component measurement from the sensor 206 from the x component measurement from the sensor 802). In doing so, the magnetic sensor measurement system 800 can provide improved magnetic flux density measurements.

Figure 9:
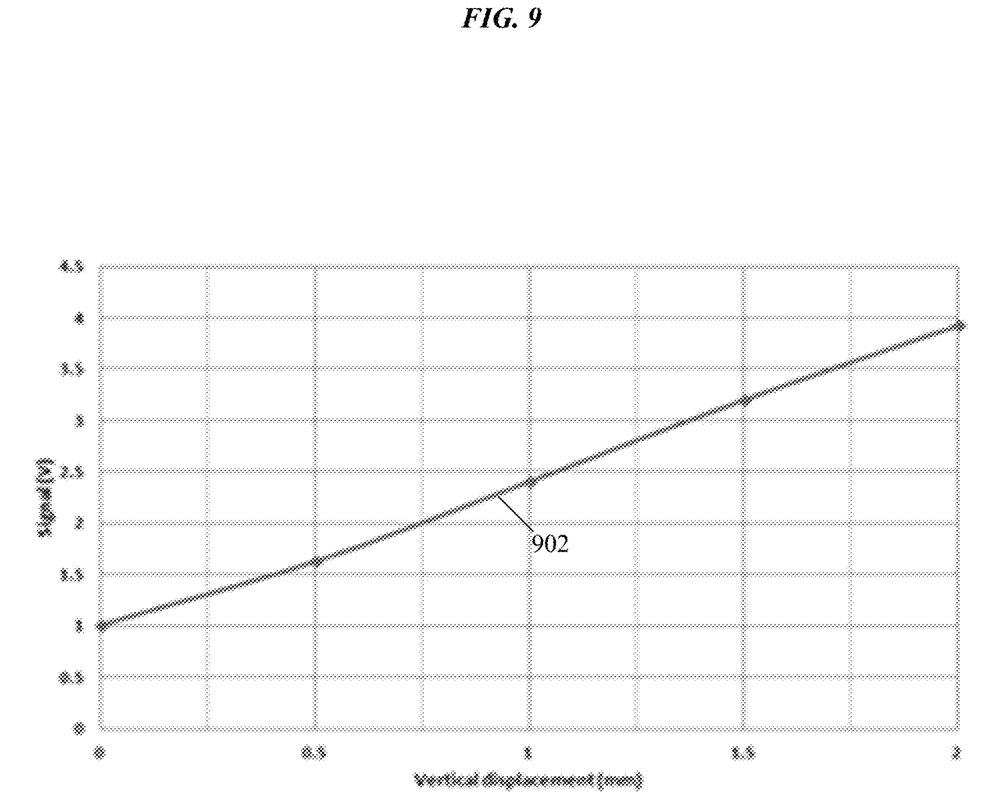
FIG. 9 illustrates exemplary results for a magnetic sensor system of the present disclosure.

FIG. 9 illustrates exemplary results for a magnetic sensor system of the present disclosure. A plot 902 shows the relationship between a signal generated by a magnetic sensor and a vertical displacement of the sensor in relation to two identical magnets. The signal generated by the magnetic sensor was based on the magnetic flux density detected by the sensor. To generate the exemplary results, a Hall sensor was placed 0.22 mm off from a center line separating the two identical magnets and 0.55 mm of from the plane passing through the two centers of the magnets. The sensor was moved relative to the magnets. A signal generated by the sensor was recorded for various vertical displacements of the sensor relative to the two magnets, resulting in plot 902. As shown in FIG. 9, the plot 902 is linear, indicating that the output signal generated by the test sensor is linear as the sensor traverses the magnetic flux density provided by the test magnets.

Figure 10:
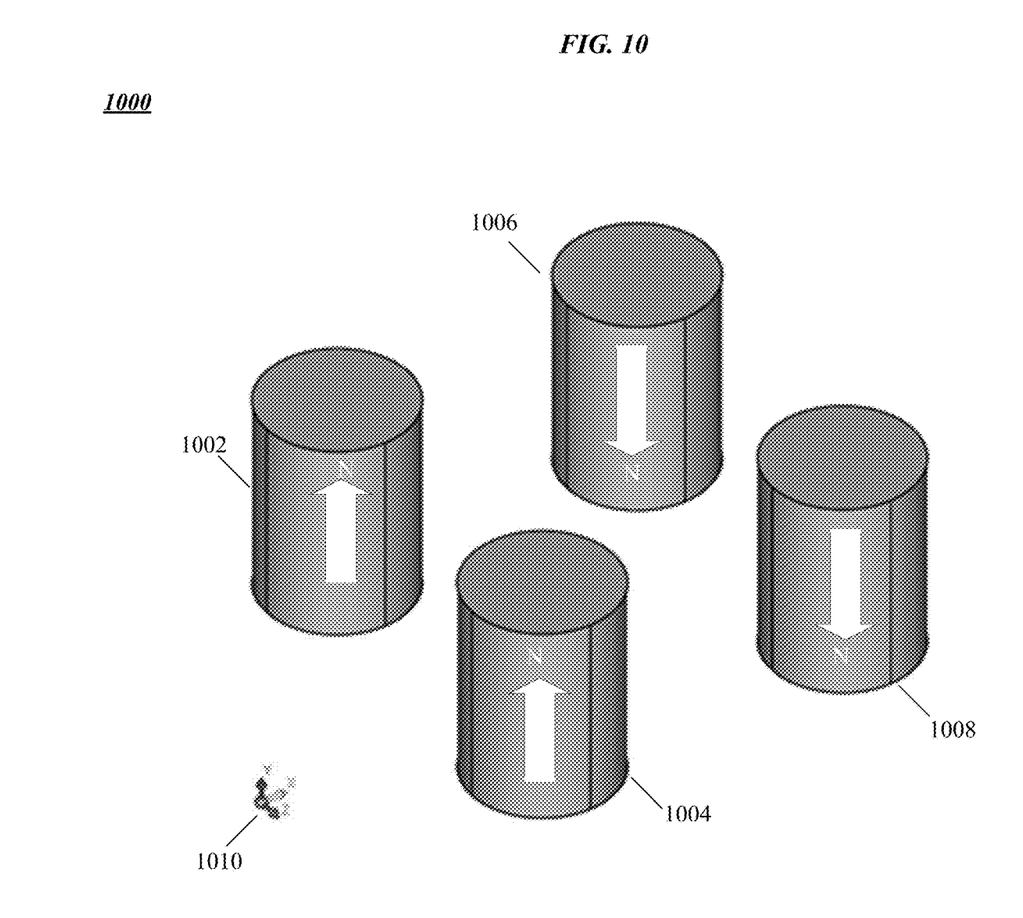
FIG. 10 illustrates an exemplary arrangement of multiple magnets for use with magnetic sensor systems of the present disclosure.

FIG. 10 illustrates an exemplary arrangement of multiple magnets 500 that can be used with the magnet sensor systems of the present disclosure as described herein. As shown in FIG. 10, four magnets are shown: a first magnet 1002, a second magnet 1004, a third magnet 1006, and a fourth magnet 1008. The magnets 1002-1008 can be of approximately the same size and shape. As an example, each of the magnets 1002-1008 can be cylindrical magnets. Alternatively, the magnets 1002-1008 can be rectangular magnets. As further shown in FIG. 5, exemplary orientation axes 1010 is also shown for illustrative and explanatory purposes. The orientation axes include "x", "y", and "z" directions to illustrate the three dimensional arrangement of the magnets 1002-1008.

As shown in FIG. 10, each of the magnets 1002-1008 are oriented vertically (e.g., relative to the y axis of the orientation axes 1010), but are not so limited. The first magnet 1002 and the second magnet 1004 are oriented similarly such that the north poles of the magnets 1002 and 1004 are positioned above the south poles of the magnets 1002 and 1004. The third magnet 1006 and the fourth magnet 1008 are also oriented similarly such that the south poles of the magnets 1006 and 1008 are positioned above the north poles of the magnets 1006 and 1008. The first and second magnets 1002 and 1004 can be considered to be oriented in a first manner to provide a first polarity and the and the third and fourth magnets 1006 and 1008 can be considered to be oriented in a second manner to provide a second, opposite polarity.

When viewed along the z axis direction of the orientation axes 1010, the second magnet 1004 can correspond to the first magnet 202 and the fourth magnet 1008 can correspond to the second magnet 204 as depicted, for example, in FIG. 2. The first magnet 1002 and the third magnet 1006 can then be seen as similarly oriented magnets positioned behind the magnets 1004 and 1008.

The arrangement 1000 shown in FIG. 10 can be used with the magnetic measurement systems described herein. For example, the magnetic measurement systems 200 and 400 can be modified to include the arrangement 1000. Further, as an example, by adjusting the orientation of the magnets 1002-1008 as described herein, the magnetic measurement systems 600 and 800 can be modified to include the arrangement 1000 (e.g., by having the north poles of the magnets 1002-1008 oriented horizontally and pointing to one another). The arrangement 1000 can be extended to additional magnets and is not limited to the four magnets as shown. Further, in accordance with the present disclosure, one or more sensors can be positioned in the center of the magnets 1002-1008 such that the one or more sensors are offset from a central vertical axis that is equidistant to each of the magnets 1002-1008. In doing so, a linear range of the one or more sensors can be enhanced over conventional positioning of magnetic sensors relative to multiple magnetic arrangements in accordance with the principles described herein.

In accordance with the present disclosure, the gap distance between the two or more magnets (e.g., in the systems described herein) can be based on the size of the magnets used in the system. Further, any offset of a sensor from a center line (e.g., either in the same plane as the center line or perpendicular thereto) can be based on the size of the magnets and/or the size of the gap distance, thereby allowing the one or more sensor lines to be positioned so as to extend a linear range of a sensor used in the systems described herein.

While the present disclosures references certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. An apparatus, comprising:
a first magnet,
a second magnet, the second magnet separated from the first magnet by a gap distance; and
a magnetic sensor movable along a sensor line, the sensor line offset from and parallel to a center line positioned between and parallel to the first and second magnets, wherein the magnetic sensor generates an output signal based on a magnetic flux density provided by the first and second magnets along the sensor line;
wherein the sensor line is offset in a direction perpendicular to a plane that contains, and that is parallel to, the center line and that bisects, and is parallel to longitudinal axes of, the first and second magnets.

2. The apparatus of claim 1, wherein the magnetic sensor is a Hall sensor.

3. The apparatus of claim 1, wherein the first magnet is oriented to have a first polarity and the second magnet is orientated relative to the first magnet to have a second, opposite polarity.

4. The apparatus of claim 3, wherein north and south poles of the first and second magnets are oriented parallel to the sensor line.

5. The apparatus of claim 3, wherein north and south poles of the first and second magnets are oriented perpendicular to the sensor line.

6. The apparatus of claim 1, wherein the first and second magnets are cylindrical magnets.

7. The apparatus of claim 6, wherein the first and second magnets have a diameter of 4.4 millimeters (mm) and a length of 6 mm.

8. The apparatus of claim 7, wherein the gap distance is 5.0 mm.

9. The apparatus of claim 8, wherein the sensor line is offset 1.25 mm from the center line in a direction towards one of the first and second magnets.

10. The apparatus of claim 7, wherein the gap distance is based on a size of the first and second magnets.

11. The apparatus of claim 1, wherein the sensor line is offset in the direction perpendicular to the plane containing the center line and bisecting the first and second magnets by an amount that is approximately equal to or less than a distance the sensor line is offset from the center line.

12. An apparatus, comprising:
a first magnet,
a second magnet, the second magnet separated from the first magnet by a gap distance;
a first magnetic sensor; and
a second magnetic sensor, the first magnetic sensor positioned along a first sensor line, the first sensor line offset from and parallel to a center line positioned between and parallel to the first and second magnets, the second magnetic sensor positioned along a second sensor line, the second sensor line offset from and parallel to the center line and on a side of the center line opposite the first sensor line, wherein the first and second magnetic sensors each generate an output signal based on a magnetic flux density provided by the first and second magnets along the first and second sensor lines, respectively;

wherein positions of the first and second magnets relative to the first and second magnetic sensors can be varied by at least one of:

moving the first and second magnetic sensors in unison along the first and second sensor lines; and moving the first and second magnets in unison along paths parallel to the first and second sensor lines.

13. The apparatus of claim 12, wherein the first and second magnetic sensors are Hall sensors.

14. The apparatus of claim 12, wherein the first magnet is oriented to have a first polarity and the second magnet is orientated relative to the first magnet to have a second, opposite polarity.

15. The apparatus of claim 14, wherein north and south poles of the first and second magnets are oriented parallel to the first and second sensor lines.

16. The apparatus of claim 14, wherein north and south poles of the first and second magnets are oriented perpendicular to the first and second sensor lines.

17. The apparatus of claim 12, wherein the first and second sensor lines are each offset in a same direction perpendicular to a plane containing the center line and bisecting the first and second magnets.

18. The apparatus of claim 17, wherein the first and second sensor lines are offset in the same direction perpendicular to the plane containing the center line and bisecting the first and second magnets by an amount that is approximately equal to or less than a distance each sensor line is offset from the center line.

19. The apparatus of claim 12, wherein a first component of the magnetic flux density measured by the first magnetic sensor is added to a first component of the magnetic flux density measured by the second magnetic sensor and a second component of the magnetic flux density measured by the first magnetic sensor is canceled by a second component of the magnetic flux density measured by the second magnetic sensor to form a combined magnetic flux density measurement.

* * * * *